(12) United States Patent
Konda

(10) Patent No.: US 8,700,011 B2
(45) Date of Patent: Apr. 15, 2014

(54) METHOD AND SYSTEM FOR PRESENTING A TRANSIT INDICATOR

(75) Inventor: Ramesh Konda, Skokie, IL (US)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/449,259

(22) Filed: Apr. 17, 2012

(65) Prior Publication Data
US 2013/0273893 A1 Oct. 17, 2013

(51) Int. Cl.
H04M 3/42 (2006.01)

(52) U.S. Cl.
USPC .......... 455/414.1; 455/414.2; 340/384.4; 340/471

(58) Field of Classification Search
USPC ............ 455/414.1, 414.2, 456.1–456.6
See application file for complete search history.

(56) References Cited

U.S. PATENT DOCUMENTS

| | | | |
|---|---|---|---|
| 7,646,312 B2 | 1/2010 | Rosen | |
| 8,131,205 B2 | 3/2012 | Rosen | |
| 8,384,555 B2 | 2/2013 | Rosen | |
| 2004/0254713 A1* | 12/2004 | Okada et al. | 701/96 |
| 2005/0280546 A1* | 12/2005 | Ganley et al. | 340/573.4 |
| 2009/0002147 A1 | 1/2009 | Bloebaum et al. | |
| 2010/0216509 A1 | 8/2010 | Riemer et al. | |
| 2011/0055546 A1* | 3/2011 | Klassen et al. | 713/150 |
| 2011/0093161 A1* | 4/2011 | Zhou et al. | 701/33 |
| 2011/0151842 A1* | 6/2011 | Olincy et al. | 455/414.1 |
| 2012/0040650 A1 | 2/2012 | Rosen | |
| 2012/0089442 A1* | 4/2012 | Olsson et al. | 705/14.1 |
| 2013/0150004 A1* | 6/2013 | Rosen | 455/414.1 |

OTHER PUBLICATIONS

International Search Report and Written Opinion for PCT Application No. PCT/EP2013/056636, mailed Jul. 10, 2013.
U.S. Appl. No. 61/049,610, filed May 1, 2008.
U.S. Appl. No. 61/175,952, filed May 6, 2008.
U.S. Appl. No. 61/594,408, filed Feb. 3, 2012.
U.S. Appl. No. 61/619,235, filed Apr. 2, 2012.
U.S. Appl. No. 61/650,078, filed May 22, 2012.
U.S. Appl. No. 61/675,179, filed Jul. 24, 2012.

* cited by examiner

*Primary Examiner* — Charles Appiah
*Assistant Examiner* — Edward Zhang
(74) *Attorney, Agent, or Firm* — Lempia Summerfield Katz LLC

(57) ABSTRACT

The disclosed embodiments relate to a method and system for presenting a transit indicator. For example, to reduce distraction, a person in communication with a mobile device user operating a vehicle is warned. A warning signal is generated when a determined speed of travel of a mobile device is greater than a predetermined threshold speed of travel and the mobile device is in communication with a communication device. The mobile device transmits the generated warning signal to the communication device to indicate to a user of the communication device that a user of the mobile device may be operating a vehicle.

20 Claims, 4 Drawing Sheets

METHOD AND SYSTEM FOR PRESENTING A TRANSIT INDICATOR

FIELD

The present embodiments relate to presenting a transit indicator.

BACKGROUND

As the number of cellular phone users has increased, the number of cellular phones in the hands of drivers on the road has also increased. A driver that talks and/or texts using a cellular phone while operating a vehicle may be undesired. The distraction of talking and/or texting using a cellular phone while operating a vehicle may have the greatest effect on inexperienced drivers such as, for example, teenagers.

To combat the risks involved with distracted driving, a number of states in the US have passed laws prohibiting the use of handheld cellular phones and/or text messaging. For example, nine states have passed laws prohibiting all drivers from using handheld cellular phones while driving, and eight of these nine states have passed laws allowing an officer to cite a driver for using a handheld cellular phone without any other traffic offense taking place. Thirty five states have banned text messaging for all drivers. Additionally, a number of states have passed laws prohibiting all cellular phone use (e.g., including the use of hands-free devices) for novice drivers and/or school bus drivers.

The majority of states in the US, however, have not passed laws prohibiting the use of handheld cellular phones. Enforcement of the laws that are in place is based, in part, on happenstance, as an officer must witness a driver using a cellular phone while operating a vehicle to cite the driver for the use.

SUMMARY

To reduce distraction, a person in communication with a mobile device user operating a vehicle is warned. A warning signal is generated when a determined speed of travel of a mobile device is greater than a predetermined threshold speed of travel and the mobile device is in communication with a communication device. The mobile device transmits the generated warning signal to the communication device to indicate to a user of the communication device that a user of the mobile device may be operating a vehicle.

In one aspect, a method includes determining a speed of travel of a mobile device. The mobile device is in communication with a communication device. The method also includes generating, by a processor, a signal based on the determined speed of travel of the mobile device, and transmitting the signal from the mobile device to the communication device.

DETAILED DESCRIPTION OF THE PREFERRED EMBODIMENTS

When a person (e.g., a first user) within or on a moving vehicle (e.g., a car, bus, train, plane, motorcycle, bicycle, or any other moving vehicle) is in communication (e.g., texting or talking) with another person (e.g., a second user), a symbol or a sound indicating that the first user is moving above a certain speed or is constantly moving is transmitted to the other person (e.g., the second user). The symbol or sound identifies, to the second user, that the first user may be operating the moving vehicle. The second user may question the first user to determine whether the first user is driving the moving vehicle or is a passenger. If the first user indicates that he or she is driving, the second user may end the conversation and resume the conversation at a later time. The second user is given the opportunity to prevent the first user from being distracted by talking or texting while operating the moving vehicle, even if the first user will not hang up the phone himself or herself. By ending the conversation, the second user may help reduce distracted driving.

Figure 1:
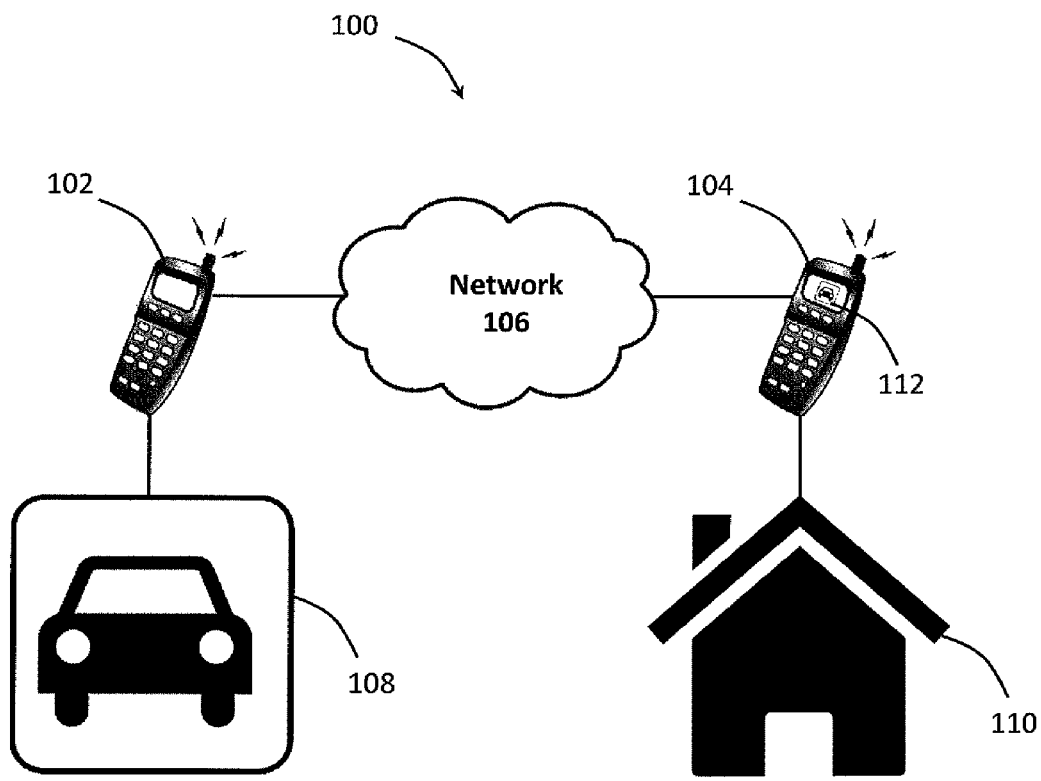
FIG. 1 shows one embodiment of a system for presenting a transit indicator.

FIG. 1 shows one embodiment of a system 100 for presenting a transit indicator. The system 100 includes a first communication device 102 (e.g., a first mobile device) in communication with a second communication device 104 (e.g., a second mobile device) via a network 106.

The first communication device 102 may be a cellular telephone, a mobile phone, a smart phone, a personal digital assistant (PDA), a tablet computer, a laptop computer, a personal navigation device (PND), a portable navigation device, a navigation system built into a vehicle and/or any other electronic device. The first communication device 102 may be carried by a first user traveling in or on a vehicle 108 such as, for example, a car, a truck, or a motorcycle. At other times, the first communication device 102 may also be carried by the first user traveling in any number of other modes of transportation including, for example, by foot, bus, train, plane, or bicycle. Rather than being carried by the first user, the first communication device 102 may be in or on the vehicle with the first user. In one embodiment, the first communication device 102 may be associated with the vehicle 108, such as being an integrated phone or navigation device.

The second communication device 104 may be a cellular telephone, a mobile phone, a smart phone, a landline telephone, a fixed wireless telephone, a PDA, a tablet computer, a laptop computer, a desktop computer, a PND, a portable navigation device, a navigation system built into a vehicle and/or any other electronic device. The second communication device 104 may, for example, be associated with a building 110 (e.g., a home or an office) and may used by a second user. In other embodiments, the second communication device 104 may be carried by or with the second user traveling by, for example, foot, car, truck, bus, motorcycle, train, plane, or bicycle. In another embodiment, the second communication device 104 may be associated with a vehicle different than the vehicle 108.

The network 106 and the communication paths between the first communication device 102 and the second communication device 104 may utilize cellular technologies including 3G, 4G, or WiMAX. Alternatively or additionally, the network and the communication paths between the first communication device 102 and the second communication device 104 may be any protocol that is used to couple two computing devices together. For example, the communication paths may utilize Ethernet, wireless, transmission control protocol (TCP), Internet protocol (IP), or multiprotocol label switching (MPLS) technologies. Combinations of networks may be used, such as communication from the first user over a cellular network and a landline network connected with the second communication device 104. The phrases "in communication" and "couple" are defined to be a direct connection or an indirect connection through one or more intermediate components. Such intermediate components may include both hardware and software based components.

In one embodiment, the first user may communicate (e.g., using the first communication device 102) with the second user (e.g., using the second communication device 104) via the network 106 while the first user is in the vehicle 108. The first communication device 102 may generate a signal (e.g., a warning signal or a transit indicator) when the first communication device 102 is traveling at or above a certain speed while the first communication device 102 and the second communication device 104 are in communication via the network 106 and transmit the generated signal to the second communication device 104. This process is described in more detail below with reference to FIG. 2.

Figure 2:
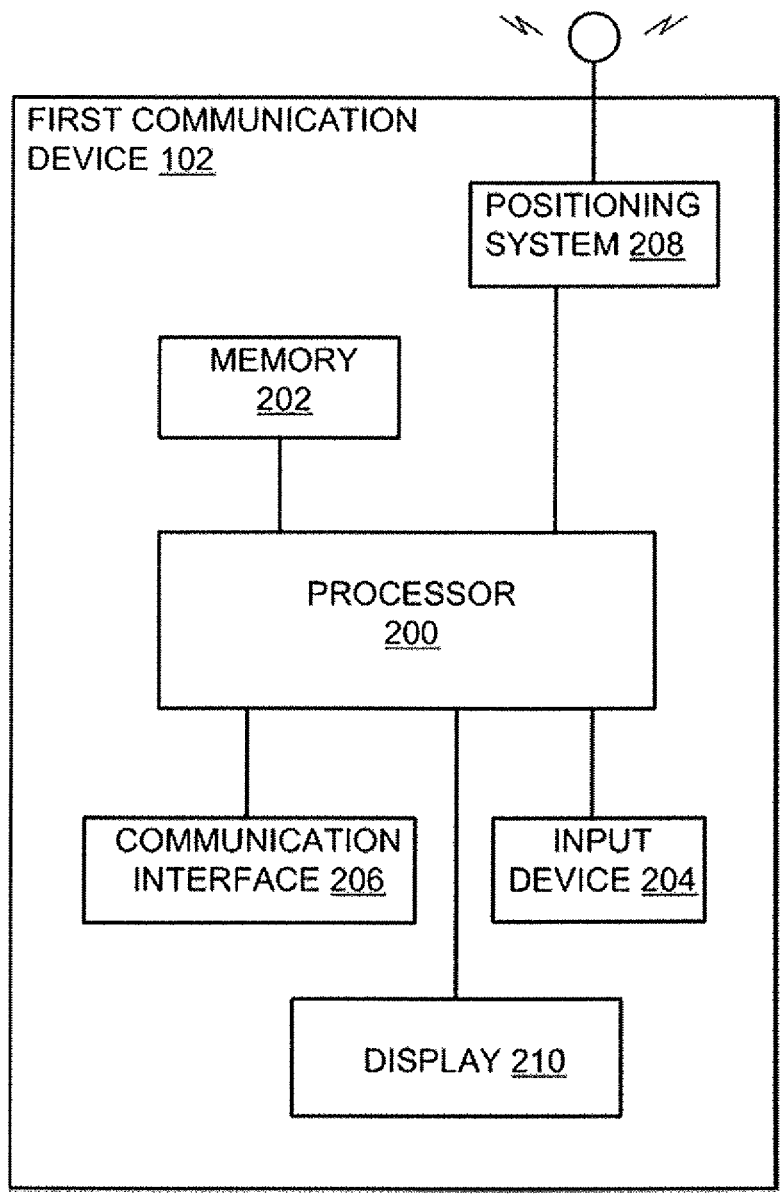
FIG. 2 shows one embodiment of a mobile device.

FIG. 2 illustrates a more detailed view of the first communication device 102 and/or the second communication device 104 of the system 100 presenting a transit indicator. The first communication device 102 includes a processor 200, a memory 202, an input device 204, a communication interface 206, a positioning system 208, and a display 210. The processor 200 is a general processor, a central processing unit, a control processor, a graphics processor, a digital signal processor, an application-specific integrated circuit, a field-programmable gate array, a digital circuit, an analog circuit, combinations thereof, or any other type of processor suitable for mobile devices and/or computers.

The memory 202 may be a volatile memory or a non-volatile memory. The memory 202 may include one or more of a read only memory (ROM), random access memory (RAM), a flash memory, an electronic erasable program read only memory (EEPROM), or other type of memory. The memory 202 may include an optical, magnetic (hard drive) or any other form of data storage device. The memory 202 may be removable from the first communication device 102, such as a secure digital (SD) memory card.

The input device 204 may be one or more buttons, keypad, keyboard, mouse, stylist pen, trackball, rocker switch, touch pad, voice recognition circuit, or other device or component for inputting data to the first communication device 102. The input device 204 and the display 210 may be combined as a touch screen, which may be capacitive, resistive, or acoustic (e.g., surface acoustic wave). The display 210 may be a liquid crystal display (LCD) panel, light emitting diode (LED) screen, thin film transistor screen, or another type of display.

The communication interface 206 may include any operable connection, such as a wireless transceiver. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities (e.g., the first communication device 102 and the second communication device 104) may be operably connected to communicate signals to each other directly or through one or more intermediate entities (e.g., processor, operating system, logic, software). Logical and/or physical communication channels may be used to create an operable connection. For example, the communication interface 206 may include an output communication interface devoted to sending signals, data, packets, or datagrams and an input communication interface devoted to receiving signals, data, packets, or datagrams. The communication interface 206 provides for wireless and/or wired communications in any now known or later developed format.

The positioning system 208 includes a global positioning system (GPS), cellular, or other position sensor for providing location data. The positioning system 208 may utilize GPS-type technology, a dead reckoning-type system, or combinations of these or other systems. In one embodiment, the positioning system 208 may include an application specific integrated circuit, a field programmable gate array, or another processor for correlating GPS signals from multiple satellites and determining a global position. By determining a change in position from data provided by the positioning system 208, the speed, acceleration, distance or other movement characteristic may be calculated. The positioning system 208 may alternatively or additionally include suitable sensing devices that measure, for example, the traveling distance, the traveling speed, the traveling direction, or combinations thereof, of the first communication device 102. For example, an accelerator or gyroscope indicates changes in orientation or acceleration.

In another embodiment, the first communication device 102 may include a geographic database and navigation-related and map-related application software program(s) that provide various navigation and map features and functions, such as route calculation, route guidance, map display, positioning, local search, destination selection and so on. Alternatively or additionally, the geographic database may be located remotely from the first communication device 102, and navigation-related and map-related application software program(s) may be run remotely from the first communication device 102 or may rely on download to the first communication device 102.

In one embodiment, the geographic database includes data used for (or configured to be compiled to be used for) navigation-related services. For example, the geographic database includes node data records, road segment or link data records, point of interest (POI) data records, and other data records. More, fewer, or different data records may be provided. In one embodiment, the other data records include cartographic ("carto") data records, routing data, and maneuver data. One or more portions, components, areas, layers, features, text, and/or symbols of a graphical model may be stored in, linked to, and/or associated with one or more of these data records. For example, one or more portions of the model may be matched with respective map or geographic records via position or GPS data associations (such as using known or future map matching or geo-coding techniques).

The link data records are links or segments representing roads, streets, or paths. The node data records are end points corresponding to the respective links or segments of the road segment data records. The road link data records and the node data records represent a road network, such as used by vehicles, cars, and/or other entities. Alternatively, the geographic database contains path segment and node data records or other data that represent pedestrian paths or areas in addition to or instead of the vehicle road record data.

The road/link segments and nodes may be associated with attributes such as geographic coordinates, street names, address ranges, speed limits, turn restrictions at intersections, and other navigation related attributes, as well as POIs such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data (such as a data point used for displaying or representing a position of a city).

The geographic database may be maintained by a map developer. The map developer collects geographic data to generate and enhance the database. There are different ways used by the map developer to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database may be a master geographic database stored in a format that facilitates updating, maintenance, and development. For example, the master geographic database or data in the master geographic database is in an Oracle spatial format or other spatial format, such as for development or production purposes. The Oracle spatial format or development/production database may be compiled into a delivery format such as a GDF format. The data in the production and/or delivery formats may be compiled or further compiled to form geographic database products or databases that may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The geographic database may be a master geographic database, but in alternate embodiments, the database may represent a compiled navigation database that may be used in or with end user devices to provided navigation-related functions. For example, the geographic database may be used with the end user device (e.g., the first communication device 102) to provide an end user (e.g., the first user) with navigation features. In such a case, the geographic database may be downloaded or stored on the end user device, or the end user device may access the geographic database through a wireless or wired connection (such as via a server and/or network).

Communication between the first communication device 102 and the second communication device 104 via the network 106 may be established by the communication interface 206. For example, the first user may input textual data (e.g., a text message and/or a phone number) into the first communication device 102 via the input device 204. The first communication device 102 may establish the communication with the second communication device 104 via the communication interface 206.

Before, during, or after establishing the communication between the first communication device 102 and the second communication device 104, the processor 200 may determine a speed of travel of the first communication device 102. For example, the processor 200 may obtain a first position of the first communication device 102, using the positioning system 208, at a first time, and obtain a second position of the first communication device 102, using the positioning system 208, at a second time. The difference between the second time and the first time may be any length of time including, for example, 0.1 s, 1 s, 2 s, 5 s, or 10 s. In other words, the processor 200 may determine the position of the first communication device 102 at any number of different intervals (e.g., every five seconds). The processor 200 may calculate the speed of travel of the first communication device 102 based on a difference between the second position and the first position, divided by the difference between the second time and the first time. In one embodiment, the processor 200 may determine the speed of travel of the first communication device 102 using a sensing device of the positioning system 208 that measures, for example, the traveling speed of the first communication device 102.

The processor 200 may determine the speed of travel of the first communication device 102 once or just after (e.g., 1 s after) the communication between the first communication device 102 and the second communication device 104 is initiated or established. For example, the first user may input, at the first communication device 102, a text message to be sent to the second user (e.g., listed in a contact list on the first communication device 102) at the second communication device 104. Once the first user initiates the communication, the processor 200 determines the speed of travel of the first communication device 102, as described above. The communication may be initiated when the first user inputs a phone number into the first communication device 102, when the first users selects a phone number corresponding to the second user stored in the first communication device 102, when the first user begins inputting a text message to the second user (e.g., the second communication device 104) into the first communication device 102, or when the first user selects, for example, a "send" button or a "call" button at the first communication device 102. Alternatively, the communication may be initiated when the second user inputs a phone number into the second communication device 104, when the second user selects a phone number corresponding to the first user stored in the second communication device 104, when the second user begins inputting a text message to the first user (e.g., the first communication device 102) into the second communication device 104, or when the second user selects, for example, a "send" button or a "call" button at the second communication device 104. The communication may be established when or after, for example, the first user or the second user sends the text message or answers the phone call. In one embodiment, the communication interface 206 does not send the text message until the processor 200 determines the speed of travel of the first communication device 102. In other embodiments, the communication interface 206 may send the test message before the processor 200 determines the speed of travel of the first communication device 102.

The processor 200 may determine the speed of travel of the first communication device 102 a single time or may determine the speed of travel of the first communication device 102 a plurality of times. The processor 200 may determine the speed of travel of the first communication device 102 throughout the communication between the first communication device 102 and the second communication device 104. In one embodiment, the processor 200 may determine the speed of travel at an interval equal to the interval, at which the position of the first communication device 102 is determined. For example, the first user may input a phone number or select an already stored phone number at the first communication device 102 and establish the communication between the first communication device 102 and the second communication device 104. The communication (e.g., the phone call) may, for example, last two minutes, and the processor 200 may determine the speed of travel of the first communication device 102 every five seconds (e.g., 24 times) during the phone call. A history of recent (e.g., within minutes) of speed of travel may be stored and acquired once the communications are to be or are established.

In other embodiments, other characteristics than speed of travel are used. Travel may be indicated by acceleration, pattern of speed, pattern of motion, pattern of acceleration, pattern of locations, a current location (e.g., on a highway), or other characteristic. Any measure indicating travel in or on a vehicle may be used. In one embodiment, additionally or alternatively, the processor 200 may determine that the first user is traveling in a vehicle while operating the first communication device 102 using position data generated by the positioning system 208, and the geographic database and navigation-related and map-related application software program(s) included in the first communication device 102 and/or running remotely. For example, the processor 200 may compare the generated position data to data stored in the geographic database, and determine if the first communication device 102 is located on a road or highway. Combined with the determined speed of travel, for example, the processor 200 may determine if the first communication device 102 is being used in a vehicle traveling on a road or highway.

The processor 200 may compare the determined speed of travel to a predetermined speed of travel. The predetermined speed of travel may, for example, be a threshold speed of travel that is stored in the memory 202 or another storage device (e.g., a server remote from the first communication device 102). The threshold speed may, for example, be a speed, at which it is clear that the first user is not traveling by foot. For example, the threshold speed may be 25 miles per hour. In other embodiments, the threshold speed may be lower (e.g., 15 miles per hour) even though a small percentage of the population may be able to travel at such a speed by foot. Other thresholds may be used for other characteristics.

In one embodiment, the first communication device 102 may transmit data for the first position of the first communication device 102 at the first time, the second position of the first communication device 102 at the second time, the determined speed of travel of the first communication device 102, the other characteristics of the first communication device 102, or a combination thereof to, for example, the server remote from the first communication device 102. The remote server may determine the speed of travel of the first communication device 102 and/or compare the determined speed of travel to the predetermined speed of travel.

The processor 200 may generate a signal (e.g., a transit indicator or a warning signal) based on the determined speed of travel of the first communication device 102. For example, the processor 200 may generate the signal when the determined speed of travel is greater than the threshold speed of travel. In one embodiment, the processor 200 may generate the signal when the determined speed of travel is greater than or equal to the threshold speed of travel. The generated signal may indicate to the second user that the first user is in transit via the vehicle 108 (e.g., via a car, a bus, a train, a plane, or a bicycle).

The warning signal or transit indicator may include, for example, an image signal or indicator, an audio signal or indicator, a video signal or indicator, or a combination thereof. For example, the image signal may include image data for any number of images representing that the first user is in transit via the vehicle 108. A red dot or a black car may be used. FIG. 1 shows an exemplary warning signal 112 embodied as an image of a black car displayed at the second communication device 104. In another example, the warning signal is text, such as "[first user] is possibly operating a vehicle." The image data may be predetermined and stored in the memory 202 or may be selectable from a plurality of image datasets by the first user using the input device 204. The audio signal may include audio data for any number of sounds representing that the first user is in transit via the vehicle 108. For example, the audio signal may include data that represents a car horn, a beep, or the word "stop." The audio data may be predetermined and stored in the memory 202 or may be selectable from a plurality of audio datasets by the first user using the input device 204. Other signals representing that the first user is in transit via the vehicle 108 may be generated by the processor 200.

The signal is provided by the first communication device 102 to the second communication device 104. Alternatively, the first communication device 102 transmits an instruction or control to the second communication device 104. The second communication device 104 stores, accesses, and provides the signal based on the instruction or control. The second user may control the type or style of signal used.

In one embodiment, the remote server may generate the warning signal and transmit the warning signal to the second communication device 104. The remote server may generate the warning signal based on the determination of the speed of travel and/or the comparison of the determined speed of travel to the predetermined speed of travel at the remote server, or based on an instruction or control transmitted from the first communication device 102. In another embodiment, the remote server transmits an instruction or control to the second communication device 104, and the second communication device 104 generates, stores, accesses, and provides the signal based on the instruction or control. The second user may control the type or style of signal used.

The communication interface 206 may transmit the generated warning signal to a communication interface of the second communication device 104. For example, the communication interface 206 may transmit the generated warning signal with the text message to be sent to the second user. Alternatively, the communication interface 206 may transmit the generated warning signal independent of the text message to be sent to the second user. In one embodiment, the communication interface 206 transmits the generated warning signal one or more times during the communication between the first user at the first communication device 102 and the second user at the second communication device 104. In one embodiment, the warning signal is transmitted to the second communication device 104 a single time at or near (e.g., within five second of) the beginning of the communication. In another embodiment, the warning signal is transmitted to the second communication device 104 a plurality of times (e.g., twenty four times) throughout the communication between the first user at the first communication device 102 and the second user at the second communication device 104 (e.g., a two minute phone call). The warning signal may be transmitted at different times during the communication. Different warning signals may be transmitted at different times during the communication. For example, an audio signal may be transmitted at or near the beginning of the communication, and an image signal may be transmitted at an interval throughout the remaining part of the communication.

The data included in the transmitted warning signal may be presented to the second user at the second communication device 104. For example, image data included in the warning signal may be displayed to the second user at a display of the second communication device. Additionally or alternatively, audio data included in the warning signal may be presented (e.g., played) to the second user at the communication interface (e.g., a speaker) of the second communication device 104. The image represented by the image data may be any number of colors, sizes, and/or in any number of orientations. The sounds represented by the audio data may be presented at any number of volumes and may be repeated any number of times.

After being presented with the warning signal, the second user may identify that the second user is speaking, texting, or communicating with someone who may be operating a moving vehicle (e.g., the vehicle 108). The second user may ask the first user whether the first user is operating the vehicle 108. If the first user responds that the first user is not operating the vehicle 108, but is instead a passenger, the first user and the second user may continue the communication. The first and/or second user may be provided with an override option to cancel or prevent further warning signals during that communication. If the first user responds that the first user is operating the vehicle 108, the second user has an opportunity to ask the first user to call or message back later and/or end the communication. This interaction between the first user and the second user and the subsequent ending of the communication may decrease the likelihood of distracted driving. The interaction may also act as a reminder to the first user to think about the law during the communication.

In other embodiments, the first communication device 102, for example, may determine, using the determined speed of travel of the first communication device 102 and/or data stored in the geographic database, if the first user is operating the first communication device 102 while riding in a train, while at a movie theater, while at a library, while riding in or operating other vehicles, or while being in other quiet locations. The communication interface 206 may, for example, transmit different generated warning signals corresponding to the different vehicles or locations (e.g., the train, the movie theater, the library) to a communication interface of the second communication device 104. After being presented with the warning signal, the second user may identify that the second user is, for example, speaking with someone who may be in a quiet car of the train or may be in the movie theater or the library. The second user may ask the first user whether the first user is, for example, in a quiet car of the train, and based on the response by the first user, the second user may end the communication.

In one embodiment, times at which the determined speed of travel is greater than (or greater than or equal to) the threshold speed and/or other data indicating that the first user was communicating via the first communication device 102 while operating the vehicle 108, for example, may be saved in the memory 202 of the first communication device 102 or another memory. The times at which the determined speed of travel is greater than (or greater than or equal to) the threshold speed and/or the other data may also be saved in a memory of the second communication device 104, the remote server, cloud storage, another storage device, or a combination thereof. When an accident involving the first user driving the vehicle 108 occurs, the police may check the memory 202 of the first communication device 102 or the other memory to determine whether the first user was texting and/or talking on the first communication device 102 while driving. Alternatively, the police may speak with the second user to determine whether the warning signal was presented to the second user at the second communication device 104 while the second user was in communication with the first user.

In another embodiment, the determined speed of travel may be saved in the memory 202 of the first communication device 102 and/or transmitted to a memory remote from the first communication device 102 (e.g., of a server remote from the first communication device 102). In other words, the determined speed of travel of the first communication device 102 may be tracked over any number of periods of time. The tracked speed of travel may be compared to other data such as, for example, geographic data during times at which the speed of travel is determined/tracked, registration data for the vehicle 108, or surveillance images (e.g., images of intersections). Based on the comparison of the tracked speed of travel and the other data, the first user may automatically be sent a ticket for operating the vehicle 108 while texting with and/or talking on the first communication device 102.

Figure 3:
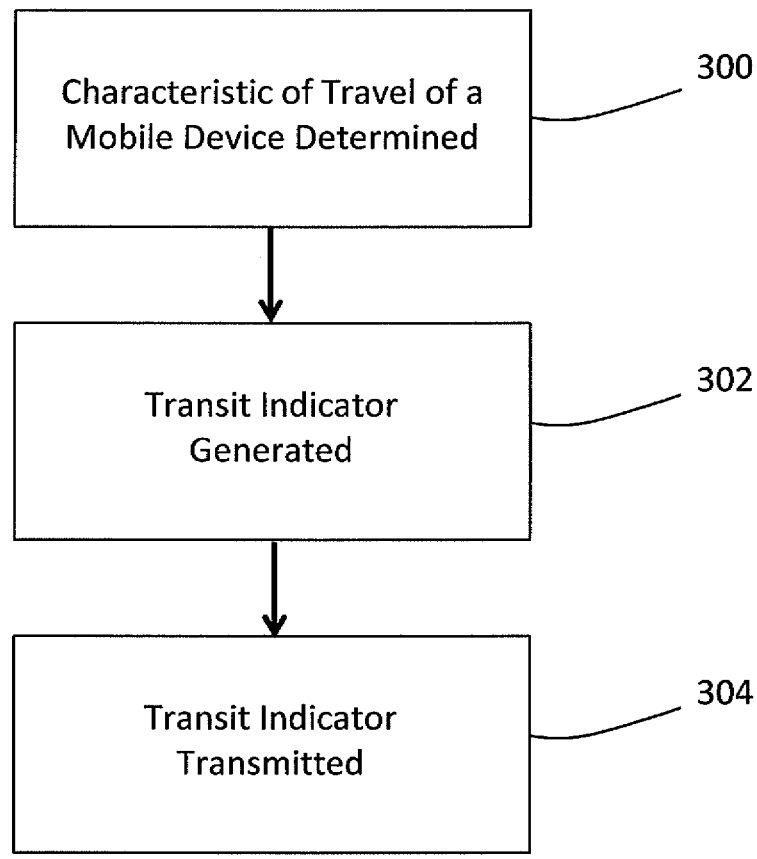
FIG. 3 shows a flowchart of one embodiment of a method for presenting a transit indicator.

FIG. 3 shows a flowchart of one embodiment of a method for presenting a transit indicator. The method may be performed using the first communication device 102 shown in FIGS. 1 and 2 or another communication device. The method is implemented in the order shown, but other orders may be used. Additional, different, or fewer acts may be provided.

In act 300, a characteristic of travel of a mobile device is determined. The mobile device is in communication, establishing the communication, or is to initiate communication with a communication device. The characteristic of travel may be a speed of travel, an acceleration, a pattern of speed, a pattern of motion, a pattern of acceleration, pattern of locations, a current location, or any other characteristic of travel. The speed of travel, for example, of the mobile device may be determined by obtaining a first position of the mobile device at a first time, and obtaining a second position of the mobile device at a second time. The first position of the mobile device and the second position of the mobile device may be obtained using a positioning system of the mobile device. The position system may include a GPS, cellular, or similar position sensor for providing location data. The speed of travel of the mobile device may be determined by dividing the difference between the second position and the first position, by the difference between the second time and the first time. Alternatively or additionally, the position system may include one or more suitable sensing devices that measure, for example, the traveling speed of the mobile device. The speed of travel of the mobile device may be determined by the sensing device. Other travel characteristics instead of speed of travel may be used.

The speed of travel may be determined at or near the beginning of the communication between the mobile device and the communication device. The speed of travel may be determined once or a plurality of times (e.g., throughout the communication). In one embodiment, the communication is a text message sent from the mobile device to the communication device. The mobile device may not send the text message to the communication device until the speed of travel is determined. In another embodiment, the communication is voice communication between the mobile device and the communication device. The speed of travel may be determined at an interval throughout the communication. For example, during a two minute conversation between a user at the mobile device and a user at the communication device, the speed of travel may be determined every five seconds throughout the course of the communication. Thus, the speed of travel may be determined twenty four times during the course of the communication. The interval may be a greater or a lesser amount of time.

In act 302, a transit indicator is generated based on the determined characteristic of travel (e.g., the speed of travel) of the mobile device. The transit indicator may be generated when the determined speed of travel of the mobile device is greater than a predetermined threshold speed of travel. The predetermined threshold speed of travel may be stored in a memory of the mobile device or another memory. The predetermined threshold speed of travel may be any number of speeds including, for example, twenty five miles per hour.

The predetermined threshold speed of travel may be greater or lesser than twenty five miles per hour.

The transit indicator may be a warning signal that includes, for example, an image signal, an audio signal, a video signal, or a combination thereof. For example, the image signal may include data for an image representing that the mobile device is moving at a speed greater than or equal to the predetermined threshold speed (e.g., a video graphic showing a car moving). The data for the image may represent an image of a vehicle, an image of a stop sign, a colored dot, an "X," text, or any other image. The audio signal may include data for a sound representing that the mobile device is moving at a speed greater than or equal to the predetermined threshold speed. The data for the sound may represent a sound of a car horn, a beep, the word "stop," or any other sound.

In act 304, the transit indicator is transmitted from the mobile device to the communication device. The transit indicator may be transmitted after the second time (e.g., after the speed of travel is determined). For example, the transit indicator may be transmitted with a text message sent from the mobile device to the communication device. The transit indicator may be transmitted a single time during the communication between the mobile device and the communication device or may be transmitted a plurality of times during the communication. For example, after the initial transmission of the transit indicator, the transit indicator may be re-transmitted at an interval throughout the communication (e.g., a voice communication). The interval is the same or different than the interval over which the speed of travel is determined. The same transit indicator or different transit indicators may be transmitted from the mobile device to the communication device throughout the communication. One or more different transit (e.g., an image signal and an audio signal) indicators may be transmitted from the mobile device to the communication device at the same time.

The transit indicator may be presented to the second user at the communication device. For example, an image signal may be displayed on a display of the communication device, and/or an audio signal may be transmitted to the second user via a speaker of the communication device. In one embodiment, the image signal may be displayed on the display while the audio signal is transmitted to the second user via the speaker. The image signal may be displayed on the display for the duration of the communication. The audio signal may be transmitted to the second user via the speaker once or a plurality of times through the duration of the communication.

Figure 4:
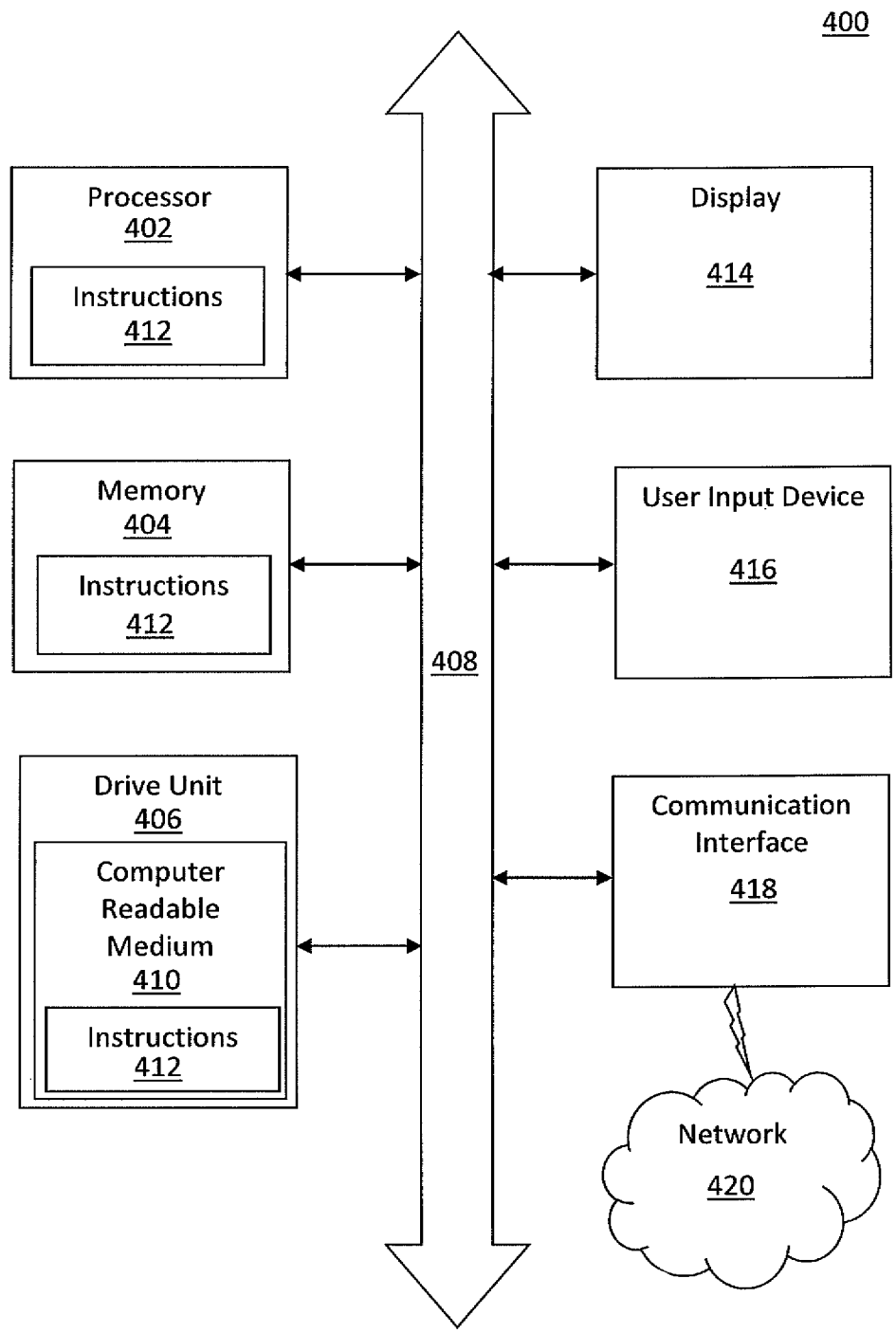
FIG. 4 shows one embodiment of a general computer system.

FIG. 4 shows an illustrative embodiment of a general computer system 400. The computer system 400 may include a set of instructions that may be executed to cause the computer system 400 to perform any one or more of the methods or computer based functions disclosed herein. The computer system 400 may operate as a standalone device or may be connected (e.g., using the network 106) to other computer systems or peripheral devices. Any of the components discussed above (e.g., the first communication device 102, the second communication device 104, and/or the remote server) may be a computer system 400 or a component in the computer system 400.

In a networked deployment, the computer system 400 may operate in the capacity of a server or as a client user computer in a client-server user network environment, or as a peer computer system in a peer-to-peer (or distributed) network environment. The computer system 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In one embodiment, the computer system 400 may be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402 (e.g., a central processing unit (CPU)), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that may communicate via a bus 408. The memory 404 may be representative of the memory 202. The memory 404 may be a main memory, a static memory, or a dynamic memory. The memory 404 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in a disk or optical drive unit 406 (e.g., a disk drive unit).

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In one embodiment, as depicted in FIG. 4, the computer system 400 may also include the disk or optical drive unit 406. The disk drive unit 406 may include a computer-readable medium 410, in which one or more sets of instructions 412 (e.g., software) may be embedded. Further, the instructions 412 may embody one or more of the methods or logic as described herein. In one embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 may communicate voice, video, audio, images or any other data over the network 420. Further, the instructions 412 may be transmitted or received over the network 420 via a communication port 418. The communication port 418 may be a part of the processor 402 or may be a separate component. The communication port 418 may be created in software or may be a physical connection in hardware. The communication port 418 is configured to connect with the network 420 or another network, external media, the display 414, any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof, and may be representative of the network 106. The wireless network may be a cellular telephone network, an 802.11, 802.16, 802.20,or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media (e.g., a centralized or distributed database and/or associated caches and servers that store one or more sets of instructions). The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In one embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various function(s) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method comprising:
   initiating a communication session between a first mobile device and a second mobile device;
   determining a characteristic of travel of the first mobile device and an input for the session between the first mobile device and the second mobile device;
   generating, by a processor, a warning signal based on the determined characteristic of travel of the first mobile device during the communication session; and
   transmitting the warning signal, as part of the communication session, from the first mobile device to the second mobile device wherein the warning signal is audio that indicates that a user of the first mobile device may be operating a motor vehicle.

2. The method of claim 1, wherein determining the characteristic of travel of the first mobile device comprises:
   obtaining a first position of the first mobile device at a first time;
   obtaining a second position of the first mobile device at a second time;
   determining a speed of travel of the first mobile device based on the first position of the first mobile device at the first time and the second position of the first mobile device at the second time.

3. The method of claim 2, wherein the obtaining of the first position, the obtaining of the second position, and the determining are repeated every time a predetermined time period elapses while the first mobile device is in communication with the second mobile device, and
   wherein the predetermined time period is a difference between the second time and the first time.

4. The method of claim 1, wherein the initiated communication input comprises a text message input at the first mobile device or a phone number input or selected at the first mobile device.

5. The method of claim 1, wherein generating the signal based on the determined characteristic of travel of the first mobile device comprises:
   comparing the determined characteristic of travel of the first mobile device to a predetermined threshold; and
   generating the signal when the determined characteristic of travel of the first mobile device is greater than the predetermined threshold.

6. The method of claim 2, further comprising:
   receiving the input for the communication at the first mobile device, the input for the communication representing a text message;
   initiating the communication between the first mobile device and the second mobile device; and
   transmitting the text message from the first mobile device to the second mobile device,
   wherein the first position and the second position are obtained before the text message is transmitted.

7. The method of claim 6, wherein transmitting the signal comprises transmitting the signal with the text message.

8. The method of claim 1, wherein the signal is an audio signal, an image signal, a video signal, or a transit indicator.

9. An apparatus comprising:
   a first mobile device comprising:
      a communication interface operable to communicate with a second mobile device in a communication session; and
      a processor operatively connected to the communication interface, the processor operable to:
         determine a speed of travel of the first mobile device during the communication session between the first mobile device and the second mobile device; and
         generate a warning when the determined speed of travel of the first mobile device is greater than a predetermined threshold speed of travel, wherein the warning signal includes audio and an image that indicates that a user of the first mobile device may be operating a motor vehicle,
      wherein the communication interface is operable to transmit the generated warning signal from the first mobile device to the second mobile device as part of the communication session between the first mobile device and the second mobile device.

10. The apparatus of claim 9, wherein the first mobile device is a cellular phone or a computer, and
    wherein the second mobile device is a cellular phone or a computer.

11. The apparatus of claim 9, further comprising a memory operatively connected to the processor, the memory operable to store the predetermined threshold speed of travel.

12. The apparatus of claim 9 wherein the processor is operable to insert the signal in the communication from the first user to the second user.

13. A method comprising:
    receiving a first position of a first mobile device at a first time after a communication session between the first mobile device and the second mobile device is initiated;
    receiving a second position of the first mobile device at a second time;
    determining, by a processor, a speed of travel of the first mobile device based on the first position of the first mobile device at the first time and the second position of the first mobile device at the second time;
    generating a warning signal when the determined speed of travel of the first mobile device is greater than a predetermined threshold speed of travel,
    wherein the warning signal includes an image signal including a representation of a transit vehicle and an audio signal indicative of the speed of travel of the first mobile device; and
    sending the warning signal including the image signal and the audio signal concurrent with the communication session.

14. The method of claim 13, further comprising:
    displaying the image signal at the second mobile device while the audio signal is delivered to the user at the second mobile device.

15. The method of claim 13, wherein the audio signal is delivered to the user at the second mobile device a plurality of times throughout the communication session.

16. A method comprising:
    receiving a first position of a first mobile device at a first time after a communication between the first mobile device and the second mobile device is initiated;
    receiving a second position of the first mobile device at a second time;
    determining, by a processor, a speed of travel of the first mobile device based on the first position of the first mobile device at the first time and the second position of the first mobile device at the second time;

generating a warning signal when the determined speed of travel of the first mobile device is greater than a predetermined threshold speed of travel, wherein the warning signal comprises an audio signal, wherein the method further comprises delivering, using the second mobile device, the audio signal to a user at the second mobile device, and wherein the audio signal represents a car horn.

17. The method of claim 13, wherein the first position is received, the second position is received, the speed of travel is determined and the warning signal is generated at the second mobile device.

18. The method of claim 13, wherein the signal comprises an image signal, and wherein the method further comprises displaying the image signal at the second mobile device.

19. The method of claim 1, wherein the warning signal represents a car horn.

20. The apparatus of claim 9, wherein the audio signal includes a car horn.

* * * * *